United States Patent [19]
Hamermesh et al.

[11] 3,723,539
[45] Mar. 27, 1973

[54] POLYMERIZATION OF GLYCIDYL 2,2-DINITRO-2-FLUOROETHOXIDE WITH A PREPOLYMER DIOL

[75] Inventors: Charles L. Hamermesh, Tarzana; Stanley M. Hirshfield, Canoga Park, both of Calif.

[73] Assignee: North American Rockwell Corporation, El Segundo, Calif.

[22] Filed: Sept. 8, 1969

[21] Appl. No.: 857,628

[52] U.S. Cl............................260/615 BF, 260/2 A
[51] Int. Cl.................................................C07c 43/12
[58] Field of Search..............260/2 A, 2 BP, 615 BF

[56] References Cited

UNITED STATES PATENTS 3,478,110   11/1969   Davis et al.......................260/615 BF
3,504,000   3/1970   Pittman et al...............260/615 BF X

FOREIGN PATENTS OR APPLICATIONS 528,136   7/1956   Canada..........................260/615 BF

*Primary Examiner*—Leland A. Sebastian
*Attorney*—L. Lee Humphries and Thomas S. MacDonald

[57] ABSTRACT

An epoxide monomer such as Glycidyl 2,2-dinitro-2-fluoroethoxide is polymerized by a cationic method using a Friedel-Crafts catalyst in the presence of a previously prepared diol whereby the diol is added to the growing end of the new chain of the polymerized epoxide monomer and terminates its growth resulting in a new $\alpha,\omega$-dihydroxy polyether of a higher molecular weight.

7 Claims, No Drawings

POLYMERIZATION OF GLYCIDYL 2,2-DINITRO-2-FLUOROETHOXIDE WITH A PREPOLYMER DIOL

RELATED APPLICATION

This application is an improvement based on the invention set forth in U.S. Ser. No. 729,822 filed May 16, 1968.

If one polymerizes an epoxide in the presence of a base (KOH or NaOH), OH functionality can normally be obtained at either end of the resultant polymer. However, some epoxides, specifically those that contain groupings that have a portion that is base sensitive, cannot be polymerized in the presence of a base because the base will attack such portion of the epoxide and destroy the molecule. In such an instance there is obviously a problem in attempting to obtain difunctionality as well as high molecular weight. The use of a Friedel-Crafts catalyst in water such as $BF_3 \cdot H_2O$ will provide a high functionality for the resulting polymer. However, one cannot obtain the desired high molecular weight. The reaction of utilizing the Friedel-Crafts catalyst in water to obtain the difunctional polymer from an epoxide is disclosed in U.S. Pat. application Ser. No. 729,822, filed May 16, 1968. Thus, though it has been previously shown that one can by cationic polymerization obtain difunctionally terminated polyethers from epoxides, it has not been possible to obtain the desired high molecular weights. The resultant materials can be used as plasticizers, prepolymers for cross-linkable binder systems and the like.

Thus an object of this invention is to provide a new cationic method for obtaining difunctional polyethers having increased molecular weights over those previously obtainable.

Another object of this invention is to provide a cationic method for preparation of difunctional polyethers having molecular weights above 1,300.

The above and other objects of this invention are accomplished by the herein method. One of the main purposes of the invention is to increase the molecular weight of an $\alpha,\omega$-dihydroxy prepolymer such as a polyether. The prepolymer is first dissolved in a suitable non-aqueous solvent such as methylene chloride. To this solution is added a Friedel-Crafts catalyst such as $BF_3$ in an amount such that the ratio of the prepolymer to catalyst is at least five to one. To the solution is then added an epoxide monomer which may be the same one from which the prepolymer was initially formed. The monomer is added to the solution in a large excess so that the mole ratio of the monomer to catalyst is at least 20 to 1. The result of the reaction which occurs over a matter of hours is for the monomer to polymerize and for the prepolymer diol to serve as a means for terminating the growing monomer chain and thereby being incorporated into the newly formed polymer. In this way the final polymer produced has a molecular weight equal to that of the chain-stopping prepolymer initially used plus that of the new growing chain. Further, the new polymer will be difunctional as a consequence of the generation of an OH group on initiation of the polymer chain, and the presence of a terminal OH in the chain-stopping prepolymer. It is believed that the invention will be better understood from the following detailed description and specific examples.

The herein invention as indicated is particularly useful and in fact required where one wishes to obtain high molecular weight and difunctional terminated polymers from epoxides that cannot be polymerized by anionic polymerization. A typical epoxide of this invention will have the general formula:

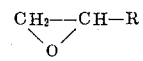

where $R$ can be virtually any grouping that will not prevent polymerization. When $R$ is a hydrocarbon chain the epoxide is susceptible to anionic polymerization and normally high molecular weight difunctionally terminated polyethers can be obtained. Additionally $R$ can be various other groups which also will enable it to be polymerized by anionic methods. However, $R$ can be a group that contains atoms whereby the epoxide cannot be polymerized by anionic methods. For example, if $R$ contains a grouping where two or three nitro groups are connected to the same carbon atom then the epoxide cannot be anionically polymerized. Additionally, where three halogens are attached to the same carbon atom in the $R$ group, anionic polymerization is not readily achieved. In these particular instances and others where anionic polymerization normally occurs in the presence of a base is not possible then the herein invention becomes of greater importance. However, it should be pointed out that the cationic method of this invention is applicable to epoxides regardless of the $R$ grouping and will work with epoxides that are also polymerizible by anionic means.

In previously filed application Ser. No. 729,822 referred to above, epoxides have been reacted in the presence of $BF_3$ in water in order to obtain difunctionally terminated polymers having functionalities in the range of 1.8 to 2 in accord with the following equation:

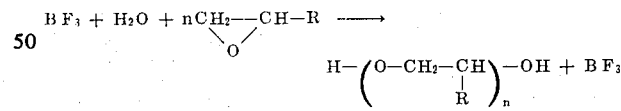

where $n$ can vary from 1 to 1,000 and $R$ is $CH_2OCH_2C(NO_2)_2F$. As disclosed in the co-pending application $R$ in the epoxide has the above grouping which contains two nitro groups and a fluorine atom connected to the same carbon atom, and thus precludes anionic polymerization.

In the above reaction where R is as defined above the ratio of $H_2O$ to $BF_3$ ranged from 5–1 to 10–1. At 10–1 the functionalities obtained are 1.8 to 2, whereas at a ratio of 5 to 1 the functionalities are 1.5 to 1.7. However, at the lower ratio a higher molecular weight polymer is obtained. However, in no event does the final polymer have a molecular weight in excess of 1,100. In fact the number average molecular weight $M_n$ generally ranges form 750 to 1,080. The above results are obtained when the reaction is carried out in methylene chloride.

The purpose of the herein invention is to obtain polymers of the type set forth in the above reaction (1) having both a high degree of functionality on the order of 2.0 and a high molecular weight. The herein method, as will be shown, involves a unique method wherein the polymer as formed in reaction (1) actually becomes a chain stopper for an epoxide monomer of the same type used to form that of the polymer or of another species of an epoxide. The herein invention effectively involves substituting for water in the above reaction (1) the polymer formed from that reaction. Thus, the first reaction that takes place in the herein method involves the reaction of $BF_3$ or similar Friedel-Crafts catalysts and a polymer in accord with the following reaction:

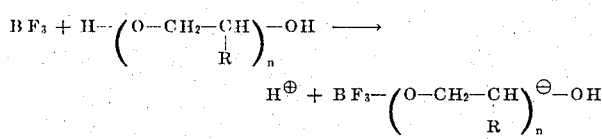

As can be seen the above reaction liberates a proton initiator which can then initiate polymerization of an epoxide in the following reaction:

The reaction (3) above is propagated in accord with the following reaction:

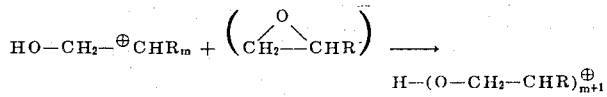

where $m$ can vary from 1 to 1,000. Finally, termination is achieved when the product in the above reaction (4) is reacted with the polymer product present from the above reaction (2) where the terminating anion is formed.

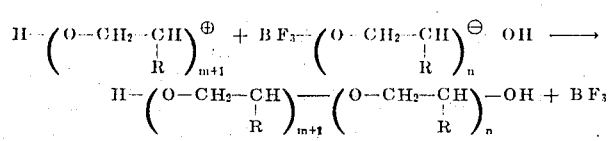

Thus, it can be seen that the resulting polymer has a degree of polymerization equal to $m$ plus 1 plus $n$. Ideally, $m$ should equal $n$ doubling the molecular weight; however, in actuality this does not generally occur. However, significant increases in molecular weight are obtained. It has been found that the higher the molecular weight of the terminating polymeric diol, the higher the final molecular weight. Thus, any increase in the average molecular weight obtained in the direct synthesis in accord with the reaction (1) will eventually be related to the final molecular weight obtained in accord with reaction (5).

In order to achieve a high molecular weight product it has been found that the mole ratio of the monomer to catalyst such as $BF_3$ in accord with reaction (2) should be at least 20 to 1. Mole ratios as high as 75 to 1 have been used to produce high molecular weight products. At higher ratios, higher molecular weight products are obtained, as would be expected. However above 75 to 1 there is not enough catalyst present to effect a complete polymerization. The mole ratio of the diol prepolymer to the catalyst in the aforegoing reaction, as indicated, will vary from 5:1 to 10:1. An excess of the diol is required in order to liberate the proton $H^{\ominus}$ which serves to initiate the polymerization of the monomeric material. Further, there must be a sufficient amount of the diol present to assure termination of the polymer formed.

It should be obvious that in performing the method of this invention virtually any diol can be utilized to terminate the polymerization of the growing chain which results from the opening of the epoxide rings of the monomeric material. Thus, termination can be effected utilizing a simple glycol such as ethylene glycol, diethylene glycol, or even an energetic glycol such as 3,3-dinitropentanediol-1,5. However, in order to obtain the desired high molecular weights, polymeric compounds which are difunctionally terminated with hydroxy groups would be utilized as shown in the aforegoing reactions.

In performing the polymerization method of the invention, the chain stopper, which is normally a difunctional prepolymer as indicated, is dissolved in a requisite quantity of solvent. A preferred solvent is methylene chloride. However, additional solvents such as chloroform with the ethanol preservative removed, and other chlorinated solvents in which the polymer is soluble, can be used. Two polymerization routes are then available, depending upon the physical state of the catalyst. For example, $BF_3$ is normally a gas. Thus when a gaseous catalyst is used, the reaction flask is connected to a vacuum line. The contents (diol + solvent) are frozen in liquid nitrogen and the gaseous catalyst introduced into the flask by vacuum line techniques. The reaction flask is then warmed to room temperature and the monomer which has been previously dissolved in the same solvent is added. The reaction mixture is then stirred with a magnetic stirrer and the polymerization is allowed to proceed at room temperature.

When the catalyst is a liquid such as $BF_3$-etherate, no vacuum line is required. The liquid catalyst is added to the diol in solvent, followed by addition of the monomer which is also dissolved in the solvent.

Polymerization then proceeds in the same manner as described with the use of the gaseous catalyst. It has been found that the method of the invention will adequately proceed at room temperature. Below 10° C adequate results are not obtainable. When the reaction has been allowed to proceed for a period of 18 to 24 hours or overnight it has been found that the reaction will go to completion in this time period. If one were desirous of determining the exact length of reaction, one could monitor the reaction by infrared analysis. At completion of the reaction the 11.2 micron band attributed to the epoxide grouping disappears. The reaction is further carried out at atmospheric pressure. Thus it can be appreciated that the reaction conditions of room temperature and atmospheric pressure in a relatively short period of time are most desirable for producing the end polymeric products. It is believed that the invention will be further understood from the following detailed examples.

EXAMPLE I

This example sets forth the process for preparing a starting epoxide material utilized, which is glycidyl 2,2-dinitro-2-fluoroethoxide, hereinafter referred to as GDNFE. In a reaction flask was placed a mixture of 182.7 grams or 6.32 moles of 90 percent 2,2-dinitro-1-fluoroethanol, and 879 grams or 6.32 moles of eipbromohydrin, EBH. To this mixture was added dropwise 253 grams or 6.32 moles of sodium hydroxide in 2 liters of water. The temperature during the addition was controlled at 0° C with a dry ice bath. After the addition was complete, the dry ice bath was replaced with a wet ice bath and the reaction mixture was stirred at 0° C for 6½ days. Twice during this time, after 4½ and 5½ days, additional sodium hydroxide was added in the amount of 50 grams in 50 milliliters of water. The total amount of sodium hydroxide added was then 353 grams or 8.8 moles. At the completion of the 6½ days, the layers formed were separated and the organic portion which was 1,265 grams was analyzed by gas chromatography. This layer analyzed as 37 weight percent EBH, 14 weight percent 2,2-dinitro-2-fluoroethanol and 49 weight percent of the desired product, glycidyl 2,2-dinitro-2-fluoroethoxide, GDNFE, which was equivalent to 620 grams of the desired product or 46.5 percent conversion. The organic portion was then pumped under high vacuum overnight at ambient temperature which removed 455 grams of EBH. Methylene chloride was then added and the solution was washed with three separate 500 milliliter portions of 5 percent sodium hydroxide and three separate 500 milliliter portions of water. Analysis by GLC at this point indicated complete removal of 2,2-dinitro-2-fluoroethanol. The orange colored methylene chloride solution was then stirred twice for 1 hour with chromotographic grade silica gel, followed by filtration which removed a significant portion of the color. The solution was then dried with magnesium sulfate, filtered and concentrated in vacuo at ambient temperature to yield 600 grams of a yellow liquid. Analysis of the product by GLC showed it to be 99 percent GDNFE, 0.3 percent low boiler and 0.7 percent high boiler. Infrared spectrum exhibited small hydroxyl and carbonyl peaks.

EXAMPLE II

In this example, a prepolymer is formed to eventually be used for chain stopping a reaction in accord with this invention. The reaction to form the prepolymer is a cationic one in accord with reaction (1) above. To a reaction flask was added 1.5 grams or 7.13 moles of GDNFE. 20 milliliters of methylene chloride solvent was then added to the monomer GDNFE. The reaction flask was connected to a vacuum line. The contents of the flask were frozen in a liquid nitrogen bath and the flask was opened to the vacuum line. After pumping the flask down to 20 microns, 60.1 cc of boron trifluoride, contained in a calibrated bulb at a pressure of 100 milliliters so that the amount of $BF_3$ was equivalent to 0.32 mmole, was condensed into the reaction flask. The closed reaction flask was then removed from the vacuum line and warmed to room temperature. Stirring with a magnetic stirring bar was begun as soon as the monomer solution thawed. The reaction was allowed to proceed until the 11.2 micron epoxide band in the infrared spectrum had disappeared. Removal of samples for infrared examination was achieved by first opening the reaction flask stopcock under a nitrogen flow. When the contents of the flask were blanketed with nitrogen, the sidearm stopper was removed and the sample was withdrawn with a hypodermic syringe.

After completion of the reaction, approximately 10 milliliters of water was added to the reaction flask and stirring continued for several minutes. The contents of the flask were transferred to a 125-milliliter separatory funnel. After two additional water washes of the methylene chloride solution, it was dried over anhydrous magnesium sulphate. The polymer solution was then decanted from the magnesium sulphate, the magnesium sulphate was washed with methylene chloride several times, and the washes were combined with the decanted solution. Removal of the methylene chloride was carried out with an evaporator under vacuum. Vacuum removal of the solvent on the evaporator was followed by additional drying in a vacuum oven at 40° C for several days. The yield of polymer was simply the weight of material remaining after drying, which was 1.31 grams. The polymer was further characterized by infrared, vapor phase osmometry, and a diborane test for functionality. A molecular weight of 985 and functionality of 1.9 were found. The prepolymer product had the following general formula:

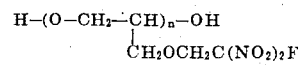

EXAMPLE III

To prepare a polymer of higher molecular weight and high functionality (an end product of this invention) the prepolymer formed in Example II was utilized.

1.81 grams or 1.20 mmoles of the prepolymer formed in Example II was dissolved in 15 milliliters of methylene chloride and added to a reaction flask. To the flask was then added 0.11 mmole of boron trifluoride, following the same procedure indicated in Example II. This was followed by addition of 1.08 grams or 5.15 mmoles of GDNFE prepared in accord with Example I. The reaction was allowed to proceed for 25 hours and then worked up as described with regard to forming the prepolymer in Example II. The final resulting polymer had a molecular weight of 1,375 and a functionality of 1.8.

We claim:

1. A method of cationic polymerization comprising:
   dissolving a diol in a suitable nonaqueous solvent,
   adding a Friedel-Crafts catalyst to said solution,
   adding glycidyl 2,2-dinitro-2-fluoroethoxide to said solution,
   reacting the materials for a period of time sufficient to polymerize said monomer and terminate one end in the growing chain with said diol.

2. The method of claim 1 comprising:
   maintaining the reactants at room temperature during the polymerization.

3. The method of claim 1 wherein the mole ratio of monomer to catalyst is at least 20:1.

4. The method of claim 1 wherein the mole ratio of diol to catalyst can vary from 5:1 to 10:1.

5. The method of claim 1 wherein the catalyst is $BF_3$.

6. The method of claim 1 wherein said diol is a dihydroxy polyether.

7. The method of claim 1 wherein the diol is a polyether which had been previously formed from the same epoxide used in the method to provide the growing chain.

* * * * *